United States Patent [19]

Lin

[11] Patent Number: 5,598,902

[45] Date of Patent: Feb. 4, 1997

[54] AUTOMATIC LUBRICATOR

[76] Inventor: Chen-yu Lin, 235, Yu Chiun Rd., Wu Feng Hsiang Taichung Hsien, Taiwan

[21] Appl. No.: 625,192

[22] Filed: Apr. 1, 1996

[51] Int. Cl.⁶ ..................................................... F16N 11/04
[52] U.S. Cl. ................. 184/45.1; 184/105.3; 137/454.5; 137/539; 251/330; 251/900
[58] Field of Search ................................... 184/45.1, 45.2, 184/105.3; 137/232, 454.5, 539; 222/336, 339, 340; 251/330, 900

[56] References Cited

U.S. PATENT DOCUMENTS

| | | | |
|---|---|---|---|
| 542,957 | 7/1895 | Ferguson | 184/45.1 |
| 1,836,042 | 12/1931 | Schauer et al. | 184/45.1 |
| 2,283,638 | 5/1942 | Klein et al. | 184/105.3 |
| 2,784,933 | 3/1957 | Newell et al. | 251/330 |
| 2,903,014 | 9/1959 | Sheppard | 137/539 |
| 3,149,697 | 9/1964 | Bendeich et al. | 137/539 |
| 3,498,413 | 3/1970 | Krieger | 184/45.1 |
| 4,860,784 | 8/1989 | Petersen et al. | 251/330 |
| 5,147,014 | 9/1992 | Pederson | 184/45.1 |

FOREIGN PATENT DOCUMENTS

| | | | |
|---|---|---|---|
| 0725308 | 5/1932 | France | 184/45.1 |
| 0331216 | 10/1935 | Italy | 251/330 |

*Primary Examiner*—Thomas E. Denion
*Assistant Examiner*—Christopher Verdier
*Attorney, Agent, or Firm*—Bacon & Thomas

[57] ABSTRACT

An automatic lubricator which includes a cylindrical oil container, a piston reciprocated in the oil container, a container holder covered on the bottom open end of the oil container and having an oil inlet and an oil outlet, two reversed coil springs concentrically mounted in the oil container to force the piston downwards in closing the oil inlet and oil outlet of the container holder, a control switch fixed to the container holder and having an adjustment screw turned to control the flow rate of the oil outlet, and a valve assembly installed in a hole on the control switch to control the passage of the oil inlet of the container holder.

1 Claim, 10 Drawing Sheets

5,598,902

1

AUTOMATIC LUBRICATOR

BACKGROUND OF THE INVENTION

The present invention relates to an automatic lubricator for lubricating a machine automatically, and relates more particularly to such an automatic lubricator which effectively prevents the leaking of lubricating oil.

FIG. 1 shows a prior art automatic lubricator (10) for lubricating a machine automatically. This automatic lubricator (10) comprises an oil container (11) having an air vent (111) at the top side and an inside annular flange (112) downwardly raised from the top side, a piston (12) reciprocated in the oil container (11) and peripherally sealed with a rubber seal ring (121), a coil spring (13) mounted in the oil container (11) between the inside annular flange (112) and the piston (12) to give a downward pressure to the piston (12), a container holder (14) covered on the bottom open side of the oil container (11) and having a vertical oil outlet (141) at the bottom side and a horizontal oil inlet (142) on the periphery, a valve assembly (15) which comprises a valve body (151) fastened to the oil inlet (142), having an oil feeding passage (153), a first inside flange (154) and a second inside flange (155) around two opposite ends of the oil feeding passage (153), and an expanded head (152) for the connection of an oil feeder, a spring (157) mounted in the oil feeding passage (153) and stopped at the first inside flange (154), and a ball (156) mounted in the oil feeding passage (153) and forced by the spring (157) into engagement with the second inside annular flange (155) to close the oil feeding passage (153). When lubricating oil is fed into the oil container (11) through the valve assembly (15), the piston (12) is moved upwards. After the feeding of lubricating oil, the piston (12) is forced by the coil spring (13) to squeeze lubricating oil out of the vertical oil outlet (141) for lubricating the mechanical parts of the machine for example the bearings. The coil spring (13) is made from a steel wire by winding, and then heat treated. As illustrated in FIGS. 2 and 3, the uniformity of the diameter D and the contained angle Q between each two turns affect the compression performance of the coil spring (13). If the coil spring (13) is not accurately positioned and the both ends of the coil spring (13) are not closely attached to the inside wall of the oil container (11) and the top side of the piston (12), the coil spring (13) may curve outwards when compressed (see the dotted line of FIG. 3).If the coil spring (13) curves outwards when compressed, the piston (12) will be forced to tilt. If the piston (12) is tilted, it cannot be smoothly moved in the oil container (11) to force lubricating oil out of the oil container (11) through the vertical oil outlet (141). As illustrated in FIG. 4, the piston (12) has a plain bottom side. When lubricating oil is fed into the oil inlet (142), the unstable feeding pressure of lubricating oil tends to cause the piston (12) to tilt. Furthermore, because the air vent (111) is made on the top side of the oil container (11), dust may pass through the air vent (111) to the inside of the oil container (11) to contaminate the piston (12) and the rubber seal ring (121). If the rubber seal ring (121) is covered with dust, the piston (12) may be jammed in the oil container (11) and unable to be reciprocated. Please see also FIG. 5. When the lubricating oil feeder is attached to the expanded head (152) of the valve body (151) of the valve assembly (15), the ball (156) is forced backwards from the second inside flange (155), permitting lubricating oil to pass through the oil feeding passage (153) to the inside of the oil container (11). When the feeding of lubricating oil is stopped, the ball (156) is forced forwards by the spring (153) to stop against the

2 second inside flange (155) and to prevent a leakage of lubricating oil. However, because the valve body (151) and the ball (156) are respectively made from metal, the second inside flange (155) and the ball (156) will wear with use quickly, causing the ball (156) to be unable to engage with the second inside flange (155) firmly. If the ball (156) and the second inside flange (155) are not firmly engaged with each other, lubricating oil will leak out of the valve body (151).

SUMMARY OF THE INVENTION

The present invention has been accomplished to provide an automatic lubricator which eliminates the aforesaid drawbacks. According to the preferred embodiment of the present invention, the automatic lubricator comprises a transparent, cylindrical oil container, the oil container comprising a bottom opening, a closed top side, an air vent on the periphery near the closed top side, and an inside annular flange downwardly raised from the closed top side at the center; a piston reciprocated in the oil container, the piston comprising two rubber seal rings mounted around the periphery, a top recess, and a rounded bottom projection; a cylindrical container holder covered on the bottom opening of the oil container, the container holder comprising a top center hole for receiving the rounded bottom projection of the piston, an oil inlet and an oil outlet in communication with the top center hole, the oil inlet and the oil outlet being stopped when the rounded bottom projection of the piston is forced into the top center hole of the container holder; a first coil spring mounted within the oil container, having a top end mounted around the inside annular flange of the oil container and a bottom end mounted within the top recess of the piston; a second coil spring mounted within the first coil spring, having a top end mounted within the inside annular flange of the oil container and a bottom end mounted within the top recess of the piston, the winding of the second coil spring being reversed to that of the first coil spring; a control switch for controlling the opening of the oil outlet of the container holder, the control switch comprising a switch base fixedly connected to the oil container holder at one end remote from the container, a connector, and an adjustment screw, the switch base comprising an opening at a bottom end thereof connected to the machine to be lubricated, an oil passage communicating between the opening of the switch base and the oil outlet of the container holder, a rounded gate disposed between the oil passage of the switch base and the opening thereof, and an oil feeding hole in communication with the oil inlet of the container holder, the connector being a female screw mounted in the opening of the switch base and peripherally sealed with a rubber seal ring, the adjustment screw being threaded into the connector, having a head at one end for turning by hand, a rounded tip at an opposite end moved in the rounded gate to regulate flow rate, and two rubber seal rings mounted around the periphery adjacent to the rounded tip; a valve assembly mounted in the oil feeding hole of the switch base to control its passage, the valve assembly comprising a cylindrical valve body fastened to the oil feeding hole of the switch base, a spring, and a ball, the valve body comprising a head disposed outside the switch base for the mounting of an oil feeder, an oil feeding passage connected to the oil feeding hole of the switch base and having an outer end terminating in a reduced oil feeding orifice, an outer thread, and an inside annular flange near one end of the oil feeding passage remote from the reduced oil feeding orifice, the spring of the valve assembly being mounted in the oil feeding passage and stopped at the inside annular flange of the valve body, the ball being mounted in the oil feeding passage and forced outwards by the spring of the valve assembly to stop the reduced oil feeding orifice; and a valve cap covered on the valve body, the valve cap having an inner thread threaded onto the outer thread of the valve body, and a rubber gasket on the inside stopped against the head of the valve body to seal the reduced oil feeding orifice.

DETAILED DESCRIPTION OF THE PREFERRED EMBODIMENT

Figure 1:
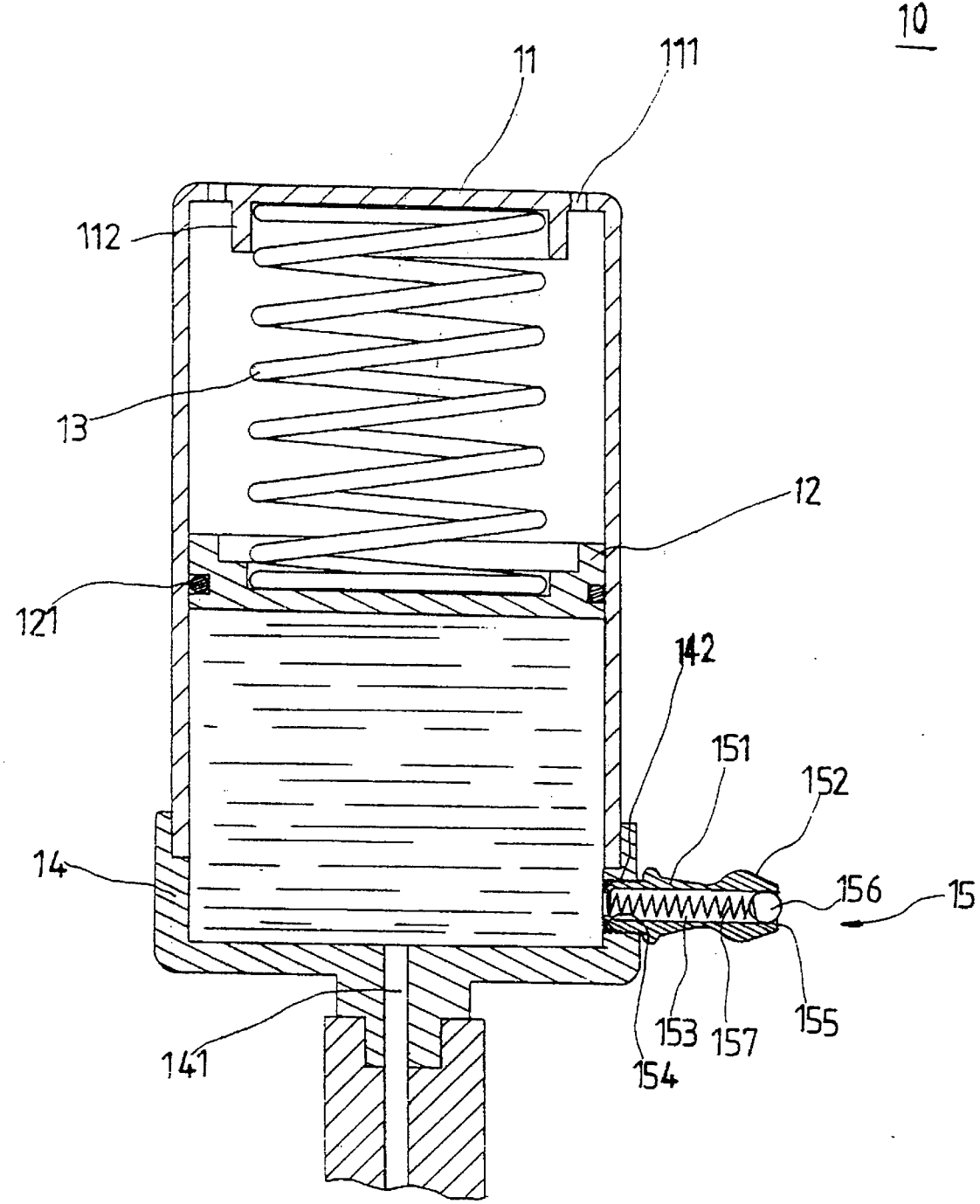
FIG. 1 is a sectional assembly view of an automatic lubricator according to the prior art.
Figure 3:
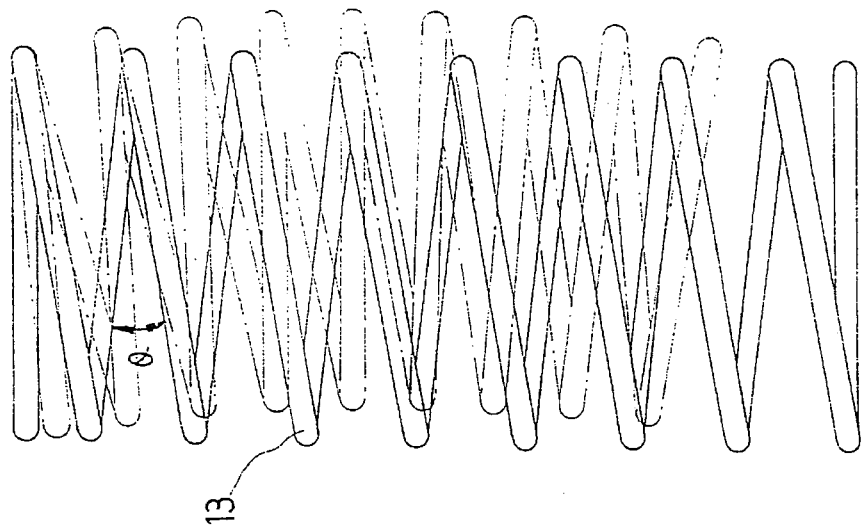
FIG. 3 shows the coil spring of FIG. 2 operated.
Figure 2:
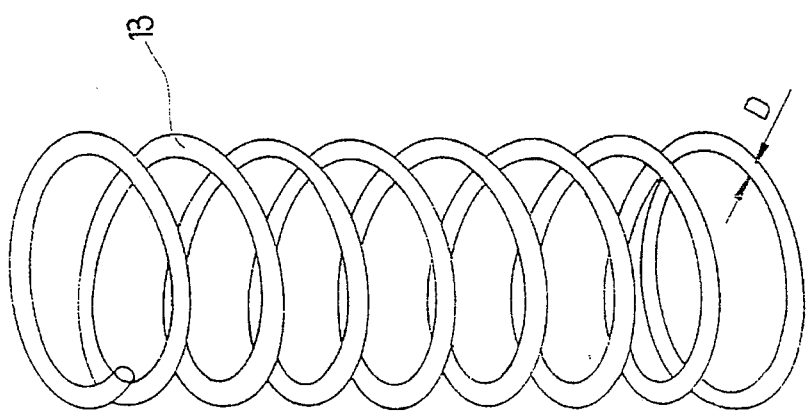
FIG. 2 is an elevational view of the coil spring shown in FIG. 1.
Figure 4:
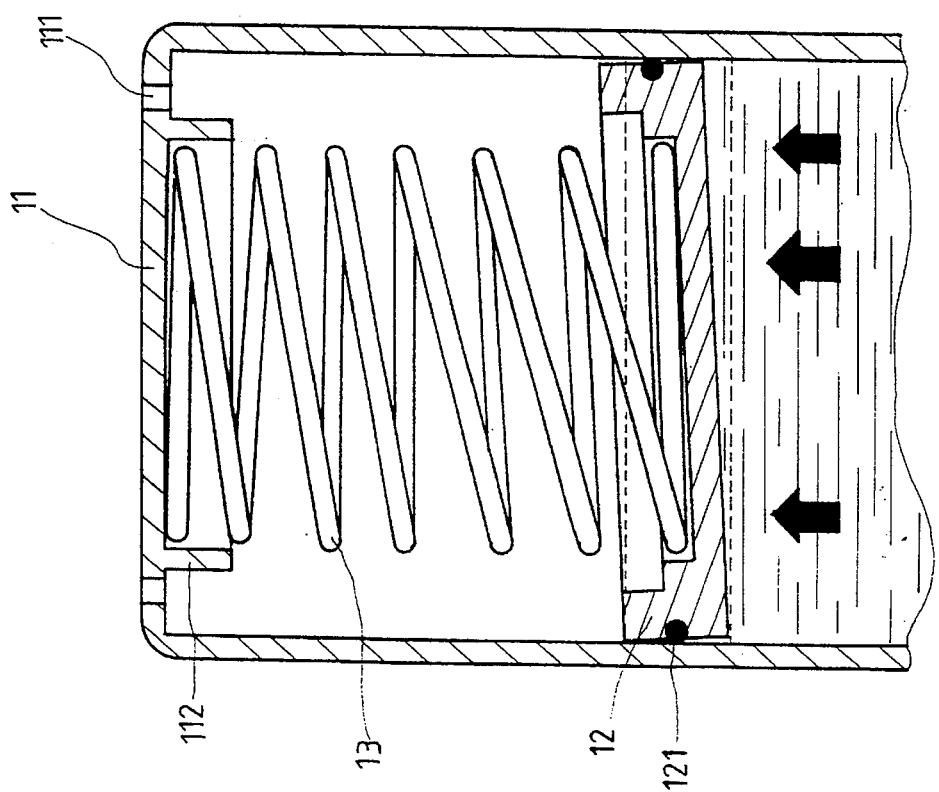
FIG. 4 is an enlarged view of the upper part of the automatic lubricator shown in FIG. 1, showing the piston moved upwards and tilted.
Figure 5:
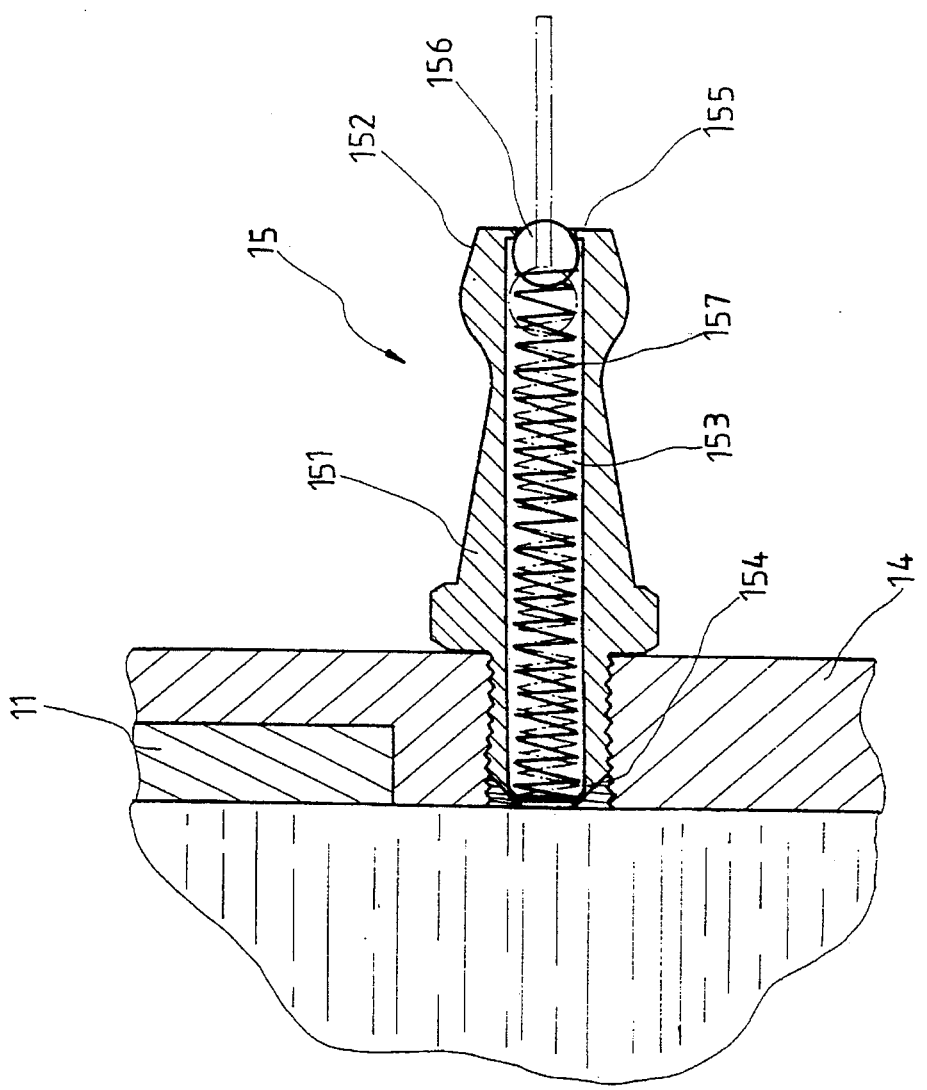
FIG. 5 is an enlarged view of the lower right part of the automatic lubricator shown in FIG. 1.
Figure 6:
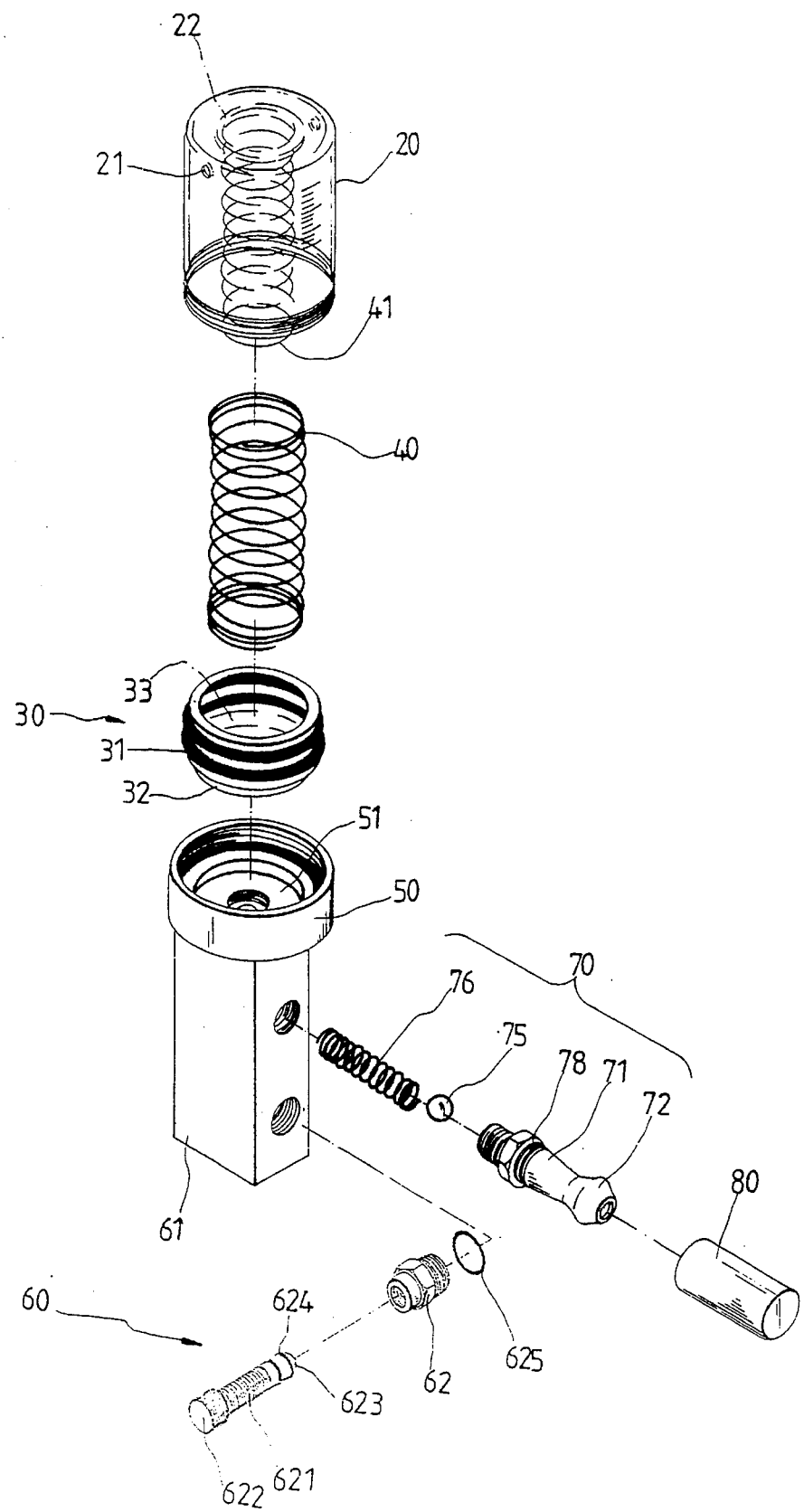
FIG. 6 is an exploded view of an automatic lubricator according to the present invention.
Figure 7:
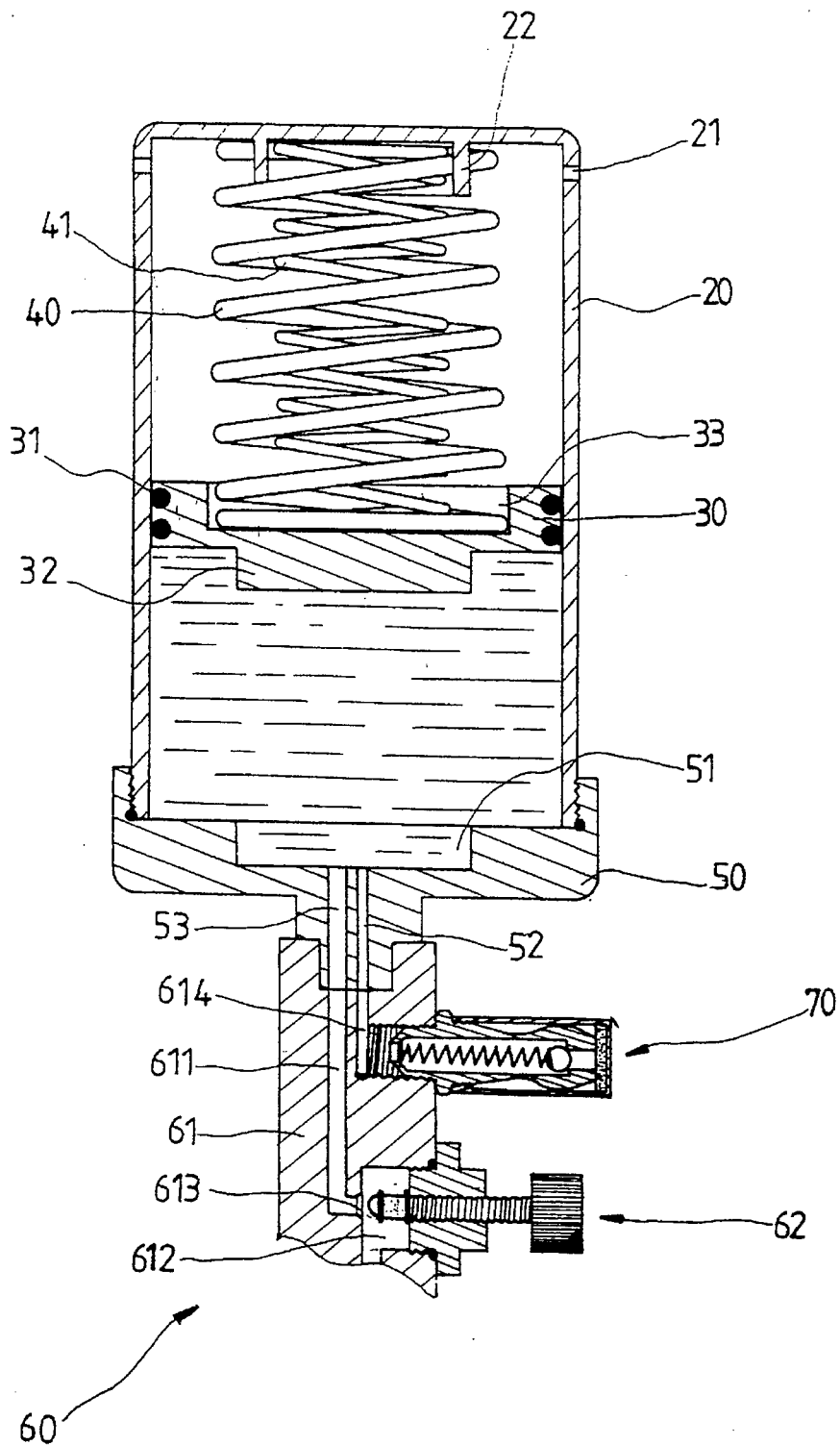
FIG. 7 is a sectional assembly view of the automatic lubricator shown in FIG. 6.

Referring to FIGS. 6 and 7, an automatic lubricator in accordance with the present invention is generally comprised of an oil container 20, a piston 30, a main spring 40, an auxiliary spring 41, a container holder 50, a control switch 60, a valve assembly 70, and a valve cap 80.

The oil container 20 is a transparent, cylindrical, downwardly opened container having an air vent 21 on the periphery near the top, and an inside annular flange 22 at the center of the top side thereof. The piston 30 is mounted within the coil container 20, having two rubber seal rings 31 mounted around the periphery, a rounded bottom projection 32, and a top recess 33. The main spring 40 is a coiled spring mounted within the oil container 20, having a top end mounted around the inside annular flange 22 and a bottom end mounted within the top recess 33 of the piston 30. The auxiliary spring 41 is a coiled spring mounted within the main spring 40, having a top end mounted within the inside annular flange 22 of the oil container 20 and a bottom end mounted within the top recess 33 of the piston 30. The winding of the auxiliary spring 41 is reversed to that of the main spring 40. The container holder 50 is a short, cylindrical member covered on the bottom open end of the oil container 20 to hold the piston 30 and the springs 40, 41 inside the oil container 20, having a top center hole 51, which receives the rounded bottom projection 32 of the piston 30, an oil inlet 52 and an oil outlet 53 through the height in communication with the top center hole 51. The control switch 60 comprises a switch base 61 fixedly connected to the container holder 50 at the bottom side, a connector, an adjustment screw 621, and a rubber seal ring 625. The switch base 61 comprises an opening 612, an oil passage 611 communicating between the opening 612 and the oil outlet 53 of the container holder 50, a rounded gate 613 disposed between the oil passage 611 and the opening 612, and an oil feeding hole 614 in communication with the oil inlet 52 of the container holder 50. The connector 62 is a female screw mounted in the opening 612 of switch base 61 and peripherally sealed by the rubber seal ring 625. The adjustment screw 621 is threaded into the connector 62, having a head 622 at one end for turning by hand, a rounded tip 623 at an opposite end for fitting into the rounded gate 613 to stop the passage between the opening 612 and the oil passage 611, and two rubber seal rings 624 and 624' mounted around the periphery adjacent to the rounded tip 623. Please see also FIG. 9, the valve assembly 70 comprises a cylindrical valve body 71 fastened to the outer end of the oil feeding hole 614, a spring 76, and a ball 75. The valve body 71 comprises a head 72 at an outer end for the mounting of an oil feeding tube, an oil feeding passage 73 through the length having an outer end terminating in a reduced oil feeding orifice 77, an inside annular flange 74 near one end of the oil feeding passage 73 remote from the reduced oil feeding orifice 77, and an outer thread 78 around the periphery. The spring 76 is mounted in the oil feeding passage 73 and stopped at the inside annular flange 74. The ball 75 is mounted in the oil feeding passage 73 and forced outwards by the spring 76 to stop the reduced oil feeding orifice 77. When the valve 70 is installed, the valve cap 80 covers the valve body 71. The valve cap 80 has an inner thread 82 threaded onto the outer thread 78 of the valve body 71, and a rubber gasket 81 on the inside stopped against the head 72 to seal the reduced oil feeding orifice 77.

Figure 8:
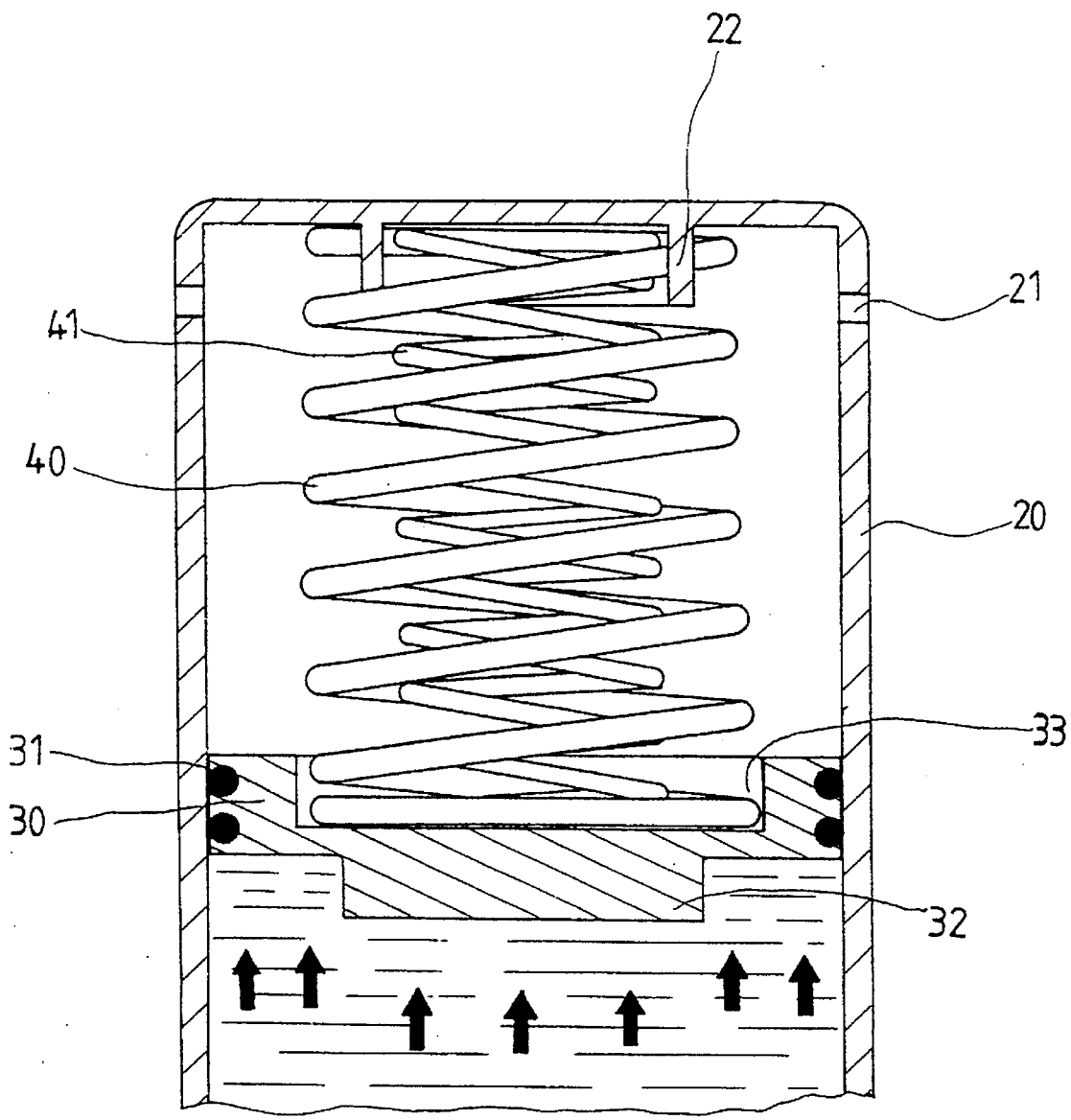
FIG. 8 is an enlarged view of the oil container shown in FIG. 7, showing the piston moved upwards.

Referring to FIG. 8, because the winding of the auxiliary spring 41 is reversed to that of the main spring 40 and the auxiliary spring 41 and because the auxiliary spring 41 is concentrically mounted within the main spring 40, the auxiliary spring 41 balances the movement of the main spring 40 when the main spring 40 is compressed and released. Therefore, the spring force of the main spring 40 can be evenly applied to the piston 30 to further force the rounded bottom projection 32 of the piston 30 into engagement with the top center hole 51 of the container holder 50. The auxiliary spring 41 also reinforces the spring force of the main spring 40 being applied to the piston 30. When lubricating oil is filled into the oil inlet 52 of the container holder 50, the pressure of the lubricating oil forces the rounded bottom projection 32 of the piston 30 upwardly away from the top center hole 51. When the feeding of lubricating oil is stopped, the piston 30 is forced downwards by the main spring 40, causing the rounded bottom projection 32 of the piston 30 to be forced into the top center hole 51 again, and therefore no residual lubricating oil is left in the container holder 50. The rubber seal rings 31 of the piston 30 seal the gap between the piston 30 and the inside wall of the oil container 20, and keep the piston 30 to be reciprocated in the oil container 20 smoothly. Further, because the air vent 21 is made on the periphery of the oil container 20 near the top, dust does not pass through the air vent 21 to the inside of the oil container 20 to interfere with the movement of the piston 30 in the oil container 20.

Figure 9:
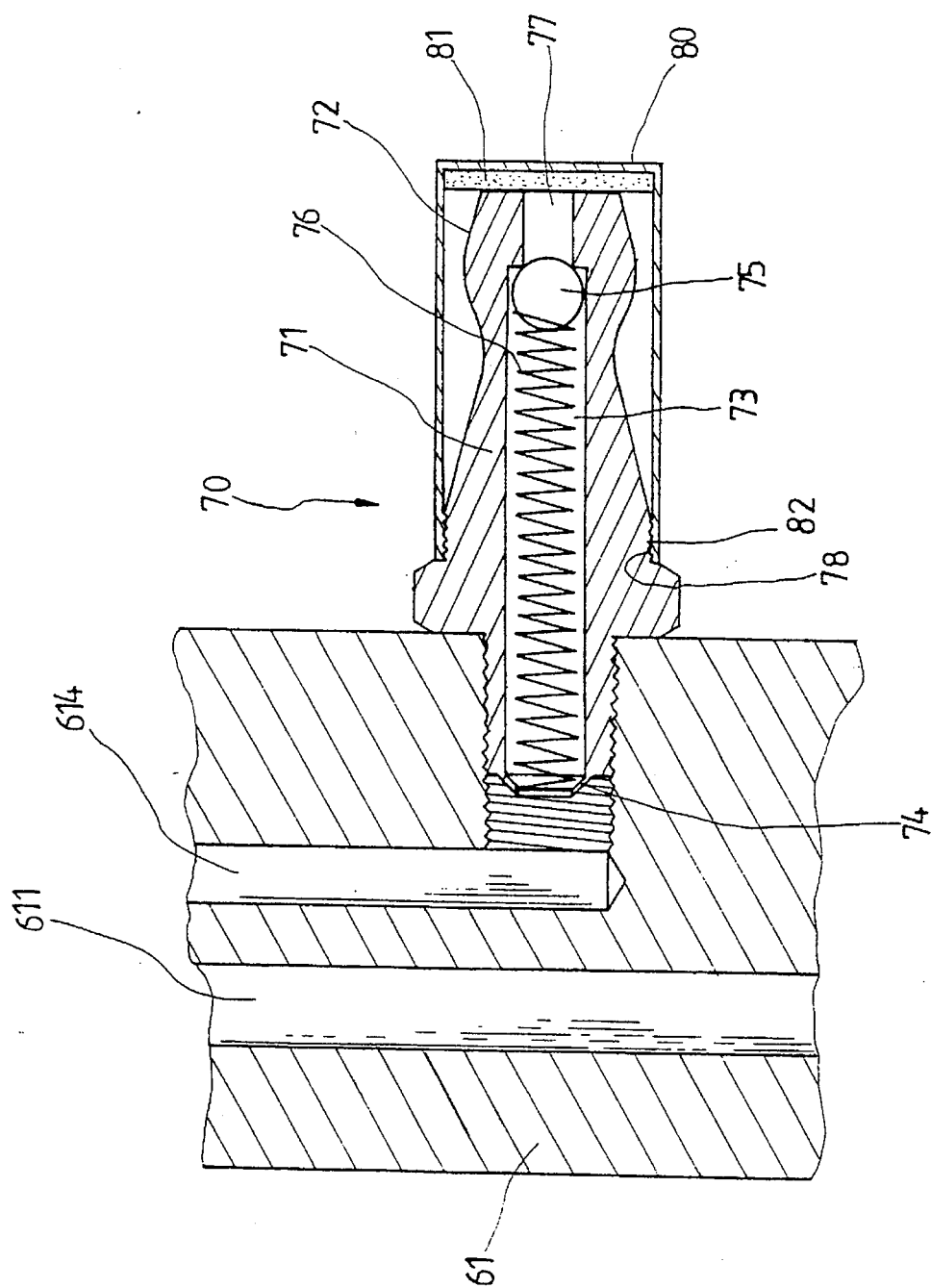
FIG. 9 is an enlarged view of the valve assembly shown in FIG. 7, showing the ball stopped at the oil feeding orifice.
Figure 10:
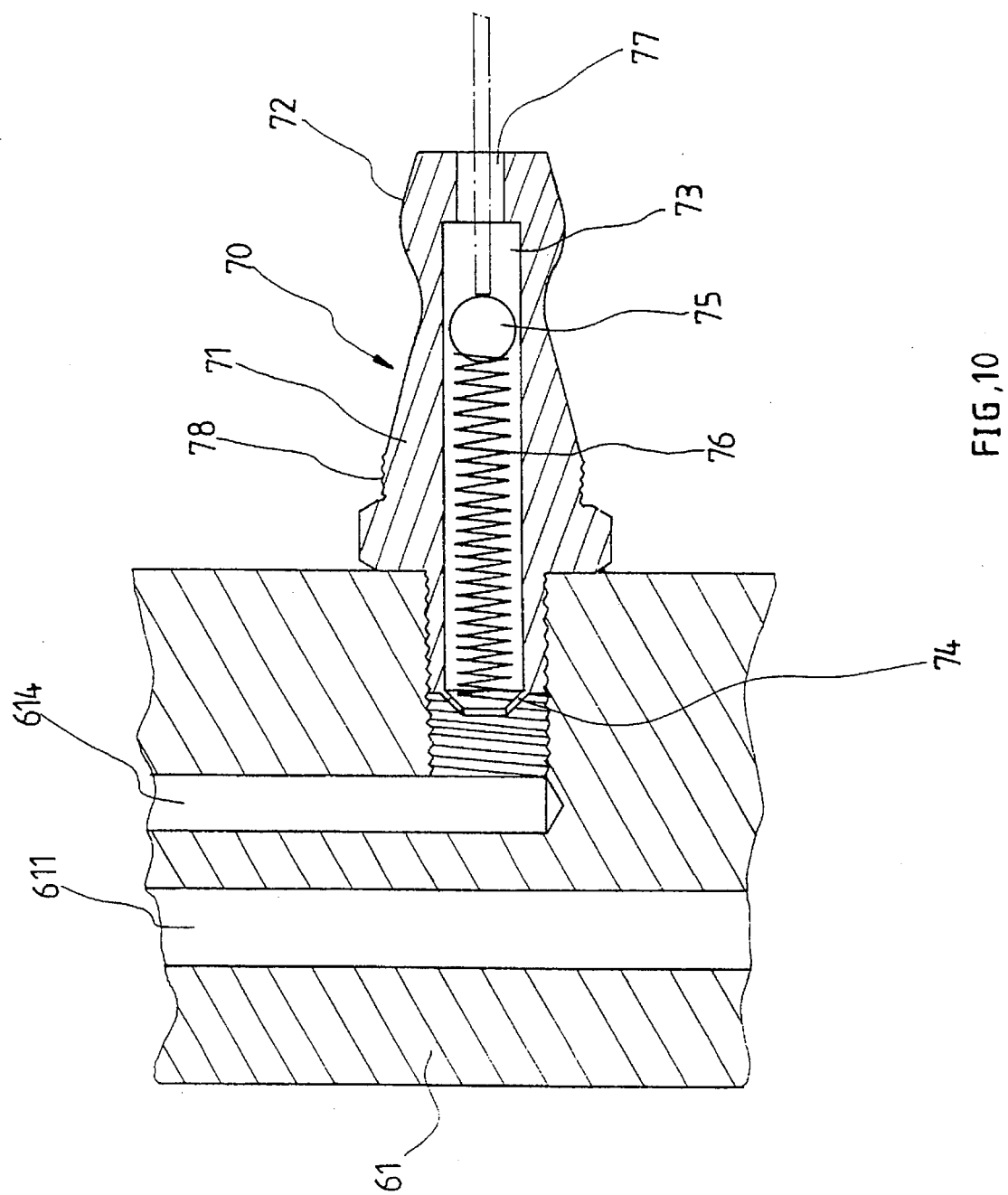
FIG. 10 is similar to FIG. 9 but showing the ball moved away from the oil feeding orifice.

Referring to FIGS. 9 and 10, and FIG. 7 again, when the valve cap 80 is disconnected from the valve body 71, the lubricating oil feeder (not shown) is connected to the head 72 of the valve body 71 with its nozzle tip inserted into the oil feeding orifice 77 to push the ball 75 backwardly away from the oil feeding orifice 77 for permitting lubricating oil to be fed into the oil feeding passage 73 and then into the oil container 20 below the piston 30 through the oil feeding hole 614. When the feeding of lubricating oil is finished and the lubricating oil feeder is disconnected from the head 72 of the valve body 71, the ball 75 is immediately forced forwards by the spring 76 to stop the oil feeding orifice 77 again, and then the valve cap 80 is threaded onto the outer thread 78 of the valve body 71 to seal the oil feeding orifice 77 with the rubber gasket 81. Therefore, the oil feeding orifice 77 is stopped twice, i.e., stopped by the ball 75 and the rubber gasket 81.

Figure 11:
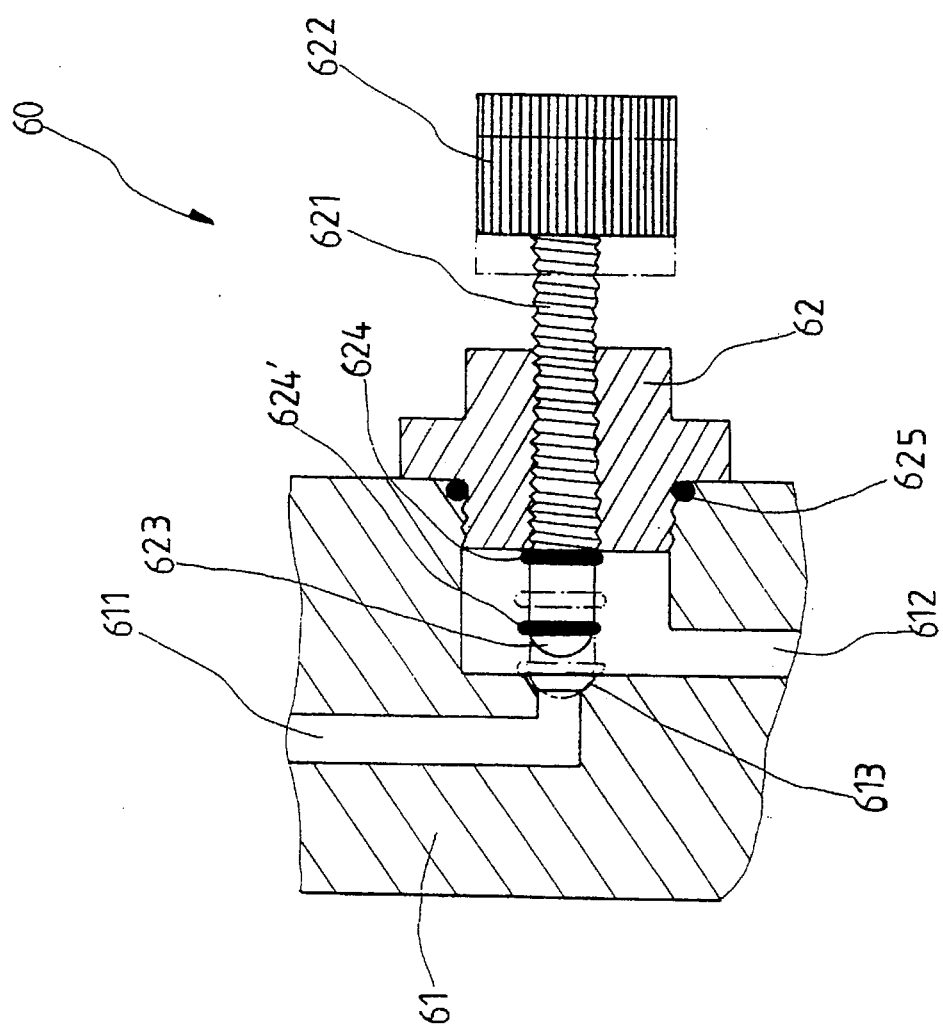
FIG. 11 is an enlarged view of the control switch shown in FIG. 7, showing the rounded tip of the adjustment screw moved away from the rounded gate.

Referring to FIG. 11 and FIG. 7 again, the control switch 60 is mounted on the container holder 50 and controlled to regulate the flow rate of the oil outlet 53. When lubricating oil is fed into the oil container 20, the oil outlet 53 of the container holder 50 is stopped by the control switch 60 to prevent a leakage of lubricating oil from the opening 612. Before lubricating the machine, the head 622 of the adjustment screw 621 is turned to move the rounded tip 623 in the rounded gate 613 so as to adjust the flow rate of lubricating oil from the oil outlet 53 to the machine through the opening 612. The rubber seal ring 625 stops lubricating oil from passing through the gap between the periphery of the connector 62 and the periphery of the opening 612. Because the adjustment screw 621 and the switch base 61 are respectively made from metal, the rounded tip 623 of the adjustment screw 621 may wear with use. If the rounded tip 623 wears, an oil leakage may occur. This oil leakage problem is eliminated by the front rubber seal ring 624' of the adjustment screw 621. When the adjustment screw 621 is turned outwards to fully open the rounded gate 613, the rear rubber seal ring 624 of the adjustment screw 621 is forced to seal the gap between the periphery of the adjustment screw 621 and the periphery of the oil feeding passage 7 to prevent a leakage of lubricating oil from the connector 62.

While only one embodiment of the present invention has been shown and described, it will be understood that various modifications and changes could be made without departing from the spirit and scope of the invention disclosed.

The invention claimed is:

1. An automatic lubricator comprising:

a transparent, cylindrical oil container, said oil container comprising a bottom opening, a closed top side, an air vent on the periphery near said closed top side, and an inside annular flange downwardly raised from said closed top side at the center;

a piston reciprocated in said oil container, said piston comprising two rubber seal rings mounted around the periphery, a top recess, and a rounded bottom projection;

a cylindrical container holder covered on the bottom opening of said oil container, said container holder comprising a top center hole for receiving the rounded bottom projection of said piston, an oil inlet and an oil outlet in communication with said top center hole, said oil inlet and said oil outlet being stopped when the rounded bottom projection of said piston is forced into the top center hole of said container holder;

a first coil spring mounted within said oil container, having a top end mounted around the inside annular flange of said oil container and a bottom end mounted within the top recess of said piston;

a second coil spring mounted within said first coil spring, having a top end mounted within the inside annular flange of said oil container and a bottom end mounted within the top recess of said piston, the winding of said second coil spring being reversed to that of said first coil spring;

a control switch for controlling the opening of the oil outlet of said container holder, said control switch comprising a switch base fixedly connected to said container holder at one end remote from said oil container, a connector, and an adjustment screw, said switch base comprising an opening at a bottom end thereof connected to a machine to be lubricated, an oil passage communicating between the opening of said switch base and the oil outlet of said container holder, a rounded gate disposed between the oil passage of said switch base and the opening thereof, and an oil feeding hole in communication with the oil inlet of said container holder, said connector being a female screw mounted in the opening of said switch base and peripherally sealed with a rubber seal ring, said adjustment screw being threaded into said connector, having a head at one end for turning by hand, a rounded tip at an opposite end moved in said rounded gate to regulate flow rate, and two rubber seal rings mounted around the periphery adjacent to said rounded tip;

a valve assembly mounted in the oil feeding hole of said switch base to control its passage, said valve assembly comprising a cylindrical valve body fastened to the oil feeding hole of said switch base, a spring, and a ball, said valve body comprising a head disposed outside said switch base for the mounting of an oil feeder, an oil feeding passage connected to the oil feeding hole of said switch base and having an outer end terminating in a reduced oil feeding orifice, an outer thread, and an inside annular flange near one end of said oil feeding passage remote from said reduced oil feeding orifice, the spring of said valve assembly being mounted in said oil feeding passage and stopped at the inside annular flange of said valve body, said ball being mounted in said oil feeding passage and forced outwards by the spring of said valve assembly to stop said reduced oil feeding orifice; and a valve cap covered on said valve body, said valve cap having an inner thread threaded onto the outer thread of said valve body, and a rubber gasket on the inside stopped against the head of said valve body to seal said reduced oil feeding orifice.

* * * * *